United States Patent
Choi et al.

(10) Patent No.: US 9,893,807 B2
(45) Date of Patent: Feb. 13, 2018

(54) METHOD OF PROVIDING DATA USING VISIBLE LIGHT COMMUNICATION (VLC) AND VLC SYSTEM THEREFOR

(71) Applicant: Electronics and Telecommunications Research Institute, Daejeon (KR)

(72) Inventors: Jong Woo Choi, Daejeon (KR); Jung Sik Sung, Daejeon (KR); Seong Hee Park, Daejeon (KR); Hyun Chul Kang, Daejeon (KR); Hyun Joo Kang, Daejeon (KR); Tae Gyu Kang, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 351 days.

(21) Appl. No.: 14/612,411

(22) Filed: Feb. 3, 2015

(65) Prior Publication Data

US 2015/0229391 A1 Aug. 13, 2015

(30) Foreign Application Priority Data

Feb. 11, 2014 (KR) .................. 10-2014-0015207

(51) Int. Cl.
*H04B 10/00* (2013.01)
*H04B 10/116* (2013.01)
*H04J 14/00* (2006.01)
*H04B 5/00* (2006.01)

(52) U.S. Cl.
CPC .......... *H04B 10/116* (2013.01); *H04B 5/0031* (2013.01)

(58) Field of Classification Search
CPC .... H04B 10/11; H04B 10/112; H04B 10/1121
See application file for complete search history.

(56) References Cited

U.S. PATENT DOCUMENTS

| | | | |
|---|---|---|---|
| 2011/0064420 A1* | 3/2011 | Rajagopal | H04B 10/1125 398/154 |
| 2013/0234607 A1 | 9/2013 | Kim et al. | |
| 2014/0207517 A1* | 7/2014 | Oshima | H04N 5/2356 705/7.29 |

FOREIGN PATENT DOCUMENTS

| | | |
|---|---|---|
| KR | 1020120119182 A | 10/2012 |
| KR | 1020120132885 A | 12/2012 |

\* cited by examiner

*Primary Examiner* — Daniel Dobson
(74) *Attorney, Agent, or Firm* — William Park Associates Ltd.

(57) ABSTRACT

A method of providing data using visible light communication (VLC) and a VLC system therefor is provided, the method for easy utilization, in a user terminal, of information provided by a lighting apparatus based on a position at which the lighting apparatus is provided.

6 Claims, 7 Drawing Sheets

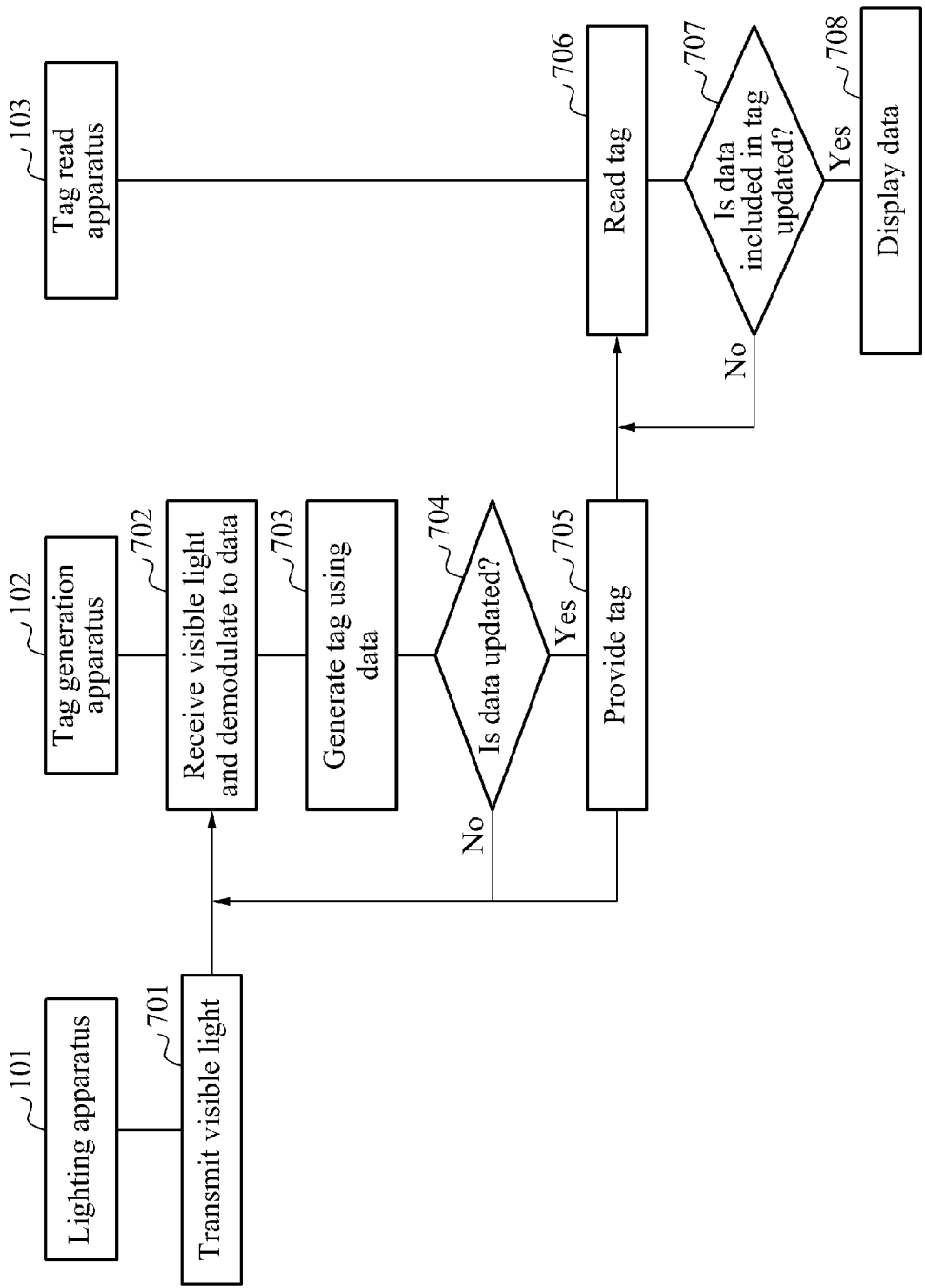

METHOD OF PROVIDING DATA USING VISIBLE LIGHT COMMUNICATION (VLC) AND VLC SYSTEM THEREFOR

CROSS-REFERENCE TO RELATED APPLICATION

This application claims the priority benefit of Korean Patent Application No. 10-2014-0015207, filed on Feb. 11, 2014, in the Korean Intellectual Property Office, the disclosure of which is incorporated herein by reference.

BACKGROUND

1. Field of the Invention

Embodiments of the present invention relate to a method of providing data using visible light communication (VLC) and a VLC system therefor, and more particularly, to a method of providing data and a VLC system for easy utilization in a user terminal of information provided by a lighting apparatus through VLC at a position at which the lighting apparatus is provided.

2. Description of the Related Art

Visible light communication (VLC) refers to technology for exchanging information through a lighting, and transmitting data through a VLC wavelength emitted from the lighting. In recent times, the VLC is also referred to as light fidelity (Li-Fi). The VLC is environmentally-friendly technology free from a danger of electromagnetic waves because information is provided by the lighting.

However, the VLC is communication technology for utilizing information provided by a lighting in an instance in which a VLC receiver for receiving information provided by a lighting is equipped in a user terminal. For example, a smart phone with portability advantages is not equipped with the VLC receiver by default, and therefore, a high utilization rate of technology associated with providing information based on the VLC may not be anticipated in such devices.

Accordingly, there is a need for an apparatus for receiving information through the VLC in lieu of the aforementioned VLC receiver, and a VLC method using the apparatus.

SUMMARY

An aspect of the present invention provides a method of providing data and a visible light communication (VLC) system therefor in which content data based on a position at which a lighting apparatus is provided is emitted through VLC, and a tag capable of near field communication (NFC) is generated corresponding to the emitted VLC to be provided.

Another aspect of the present invention also provides a VLC system for conveniently utilizing content data included in a tag by reading the tag generated through VLC of a lighting.

According to an aspect of the present invention, there is provided a method of providing data performed by a lighting apparatus, the method including packetizing content data, and modulating the packetized content data to a visible light, and transmitting the visible light to a tag generation apparatus, wherein the content data is demodulated and generated in a form of a tag capable of NFC.

According to an aspect of the present invention, there is provided a method of providing data performed by a tag generation apparatus, the method including receiving a visible light from a lighting apparatus, and demodulating the received visible light to packetized content data, generating a tag capable of NFC corresponding to the demodulated content data, and providing the generated tag, wherein the generated tag is read by a tag read apparatus, and content data, included in the tag, based on a position at which the lighting apparatus is provided, is extracted from the tag read apparatus.

According to an aspect of the present invention, there is provided a method of providing data performed by a tag read apparatus, the method including reading a tag provided by a tag generation apparatus through NFC, extracting content data from the read tag, and providing the extracted content data through a display, wherein the read tag is transmitted through a visible light of a lighting apparatus provided at differing positions, and content data, included in the tag, based on a position at which the lighting apparatus is provided, is extracted.

According to an aspect of the present invention, there is provided a lighting apparatus, including a data packetizer to packetize content data, and a visible light transmitter to modulate the packetized content data to a visible light, and transmit the visible light to a tag generation apparatus, wherein the content data is demodulated and generated, by the tag generation apparatus, in a form of a tag capable of NFC.

According to an aspect of the present invention, there is provided a tag generation apparatus, the apparatus including a data demodulator to receive a visible light from a lighting apparatus, and demodulate the received visible light to packetized content data, a tag generator to generate a tag capable of NFC corresponding to the demodulated content data, and a tag provider to provide the generated tag, wherein the generated tag is read by a tag read apparatus, and content data, included in the tag, based on a position at which the lighting apparatus is provided, is extracted from the tag read apparatus.

According to an aspect of the present invention, there is provided a tag read apparatus, the apparatus including a tag reader to read a tag provided by a tag generation apparatus through NFC, a data extractor to extract content data from the read tag, and a data provider to provide the extracted content data through a display, wherein the read tag is transmitted through a visible light of a lighting apparatus provided at differing positions, and content data, included in the tag, based on a position at which the lighting apparatus is provided, is extracted.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 7 is a diagram illustrating a method of providing data of a VLC system according to an embodiment of the present invention.

DETAILED DESCRIPTION

Figure 1:
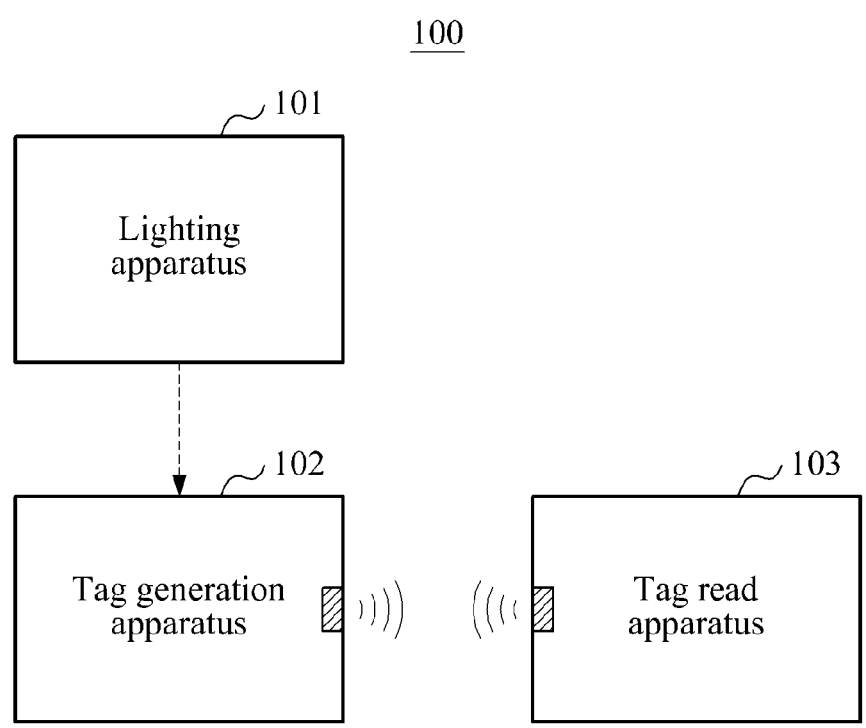
FIG. 1 is a diagram illustrating a configuration of a visible light communication (VLC) system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a visible light communication (VLC) system 100 according to an embodiment of the present invention.

Referring to FIG. 1, the VLC system 100 includes a lighting apparatus 101, a tag generation apparatus 102, and a tag read apparatus 103.

The lighting apparatus 101 may transmit a visible light obtained by modulating content data to the tag generation apparatus 102 through VLC. In this example, the content data may include a variety of content to be provided based on a position at which the lighting apparatus 101 is provided. As an example, the content data may include a variety of content to be provided from a lighting apparatus disposed internally or externally to a building, for example, building location information and events information.

The lighting apparatus 101 may be provided at a plurality of differing positions corresponding to a purpose of use of content data to be provided. As an example, the lighting apparatus 101 may be provided at an entrance of a building lobby and transmit content data associated with events to promote the events currently being held inside the building.

In this example, the lighting apparatus 101 may modulate the content data having an electric signal to the visible light to use VLC, and transmit the modulated visible light to the tag generation apparatus 102.

The tag generation apparatus 102 may receive the visible light output from the lighting apparatus 101, and demodulate the content data. In this example, the tag generation apparatus 102 may demodulate the content data in a packet unit. For example, the tag generation apparatus 102 may extract the content data included in the visible light by demodulating the content data modulated to the visible light. The tag generation apparatus 102 may generate a tag capable of near field communication (NFC) corresponding to the demodulated content data, and provide the tag so as to be readable by the tag read apparatus 103.

The tag read apparatus 103 may read the tag generated in the tag generation apparatus 102 through NFC. The tag read apparatus 103 may extract the content data from the read tag. In this example, the content data may refer to information provided from the lighting apparatus, and include content data based on the position at which the lighting apparatus is provided.

The tag read apparatus 103 may provide the content data extracted through a display. The tag read apparatus 103 may provide a variety forms of information through the provided content data utilized as data in various applications included in the tag read apparatus 103.

For example, the lighting apparatus 101 may transmit a visible light including the content data to the tag generation apparatus 102 through VLC. The tag generation apparatus 102 may extract the content data through the visible light, and generate a tag readable in the tag read apparatus 103 corresponding to the extracted content data. The tag read apparatus 103 may read the generated tag, extract the content data included in the read tag, and provide the extracted content through the display.

The lighting apparatus 101, the tag generation apparatus 102, and the tag read apparatus 103 may be configured to be a system independently operating and organically operating through an iterative process.

Figure 2:
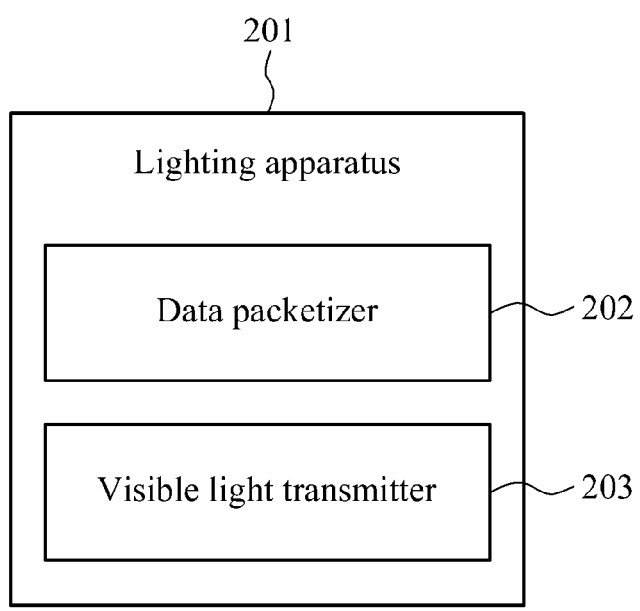
FIG. 2 is a diagram illustrating a configuration of a lighting apparatus according to an embodiment of the present invention.

FIG. 2 is a diagram illustrating a configuration of a lighting apparatus 201 according to an embodiment of the present invention.

Referring to FIG. 2, the lighting apparatus 201 includes a data packetizer 202 and a visible light transmitter 203.

The data packetizer 202 may packetize content data based on a position at which a lighting apparatus is provided. As an example, the data packetizer 202 may packetize content data in a predetermined length based on a volume of the content data. In this example, the content data may be demodulated by a tag generation apparatus, and generated to be a tag capable of NFC.

The visible light transmitter 203 may modulate the packetized content data to a visible light. For example, the visible light transmitter 203 may modulate the content data to have a VLC wavelength emittable by the lighting apparatus 201. The visible light transmitter 203 may transmit the visible light modulated from the content data to the tag generation apparatus.

The lighting apparatus 201 may provide the content data through VLC by being installed at predetermined intervals or positions based on a purpose of use. In this example, the lighting apparatus 201 may perform environmentally-friendly communication free from adverse effects of electromagnetic waves produced during electric communication by providing information through VLC rather than through the electric communication.

For example, the lighting apparatus 201 may transmit the content data to the tag generation apparatus through a visible light using VLC in which communication is performed based on a visible light emitted from a lighting.

Figure 3:
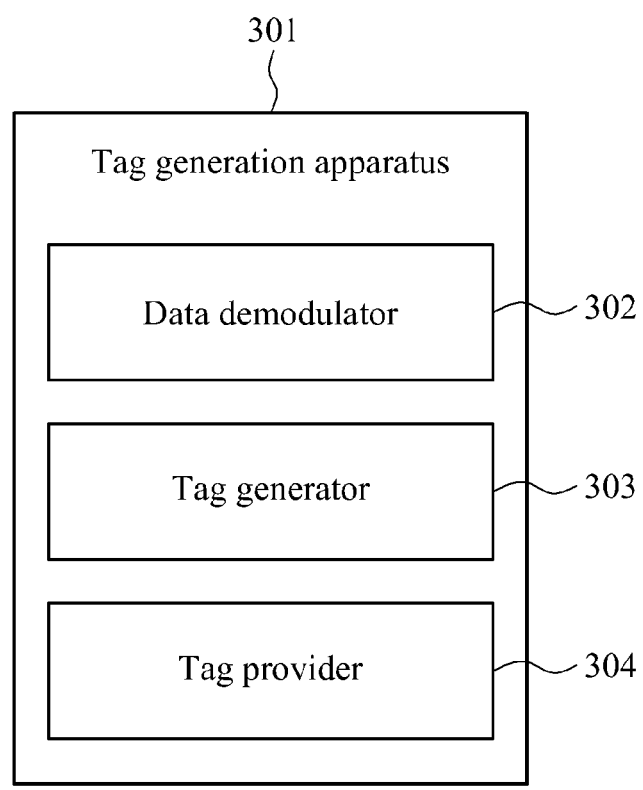
FIG. 3 is a diagram illustrating a configuration of a tag generation apparatus according to an embodiment of the present invention.

FIG. 3 is a diagram illustrating a configuration of a tag generation apparatus 301 according to an embodiment of the present invention.

Referring to FIG. 3, the tag generation apparatus 301 includes a data demodulator 302, a tag generator 303, and a tag provider 304.

The data demodulator 302 may receive a visible light emitted from a lighting apparatus, and demodulate the received visible light to packetized content data. For example, the data demodulator 302 may demodulate the content data included in the received visible light, and extract the content data demodulated in a packet unit.

The tag generator 303 may generate a tag capable of NFC corresponding to the demodulated content data. For example, the tag generator 303 may analyze the demodulated content data in a packet unit, and generate the tag corresponding to the analyzed content data. By way of example, the tag generator 303 may generate an NFC tag to be used in NFC corresponding to the demodulated content data.

The tag generator 303 may verify whether the content data included in the visible light received from the lighting apparatus is updated. When the content data is updated, the tag generator 303 may re-generate a tag capable of NFC corresponding to the updated content data. For example, the tag generator 303 may generate the tag with respect to the content data included in the visible light received from the lighting apparatus corresponding to a position at which the lighting apparatus is provided based on a movement of the tag generation apparatus 301. In this example, due to flexibility of the tag generation apparatus 301 various visible lights may be received from lighting apparatuses provided at differing positions, and a plurality of tags corresponding to the visible lights may be generated, respectively. The tag generation apparatus 301 may need to verify whether an accurate visible light is received from a lighting apparatus provided at a corresponding position. Accordingly, the tag generation apparatus 301 may verify, through use of the tag generator 303, whether the content data included in the received visible light is updated, and re-generate a tag corresponding to the content data updated based on a result of the verification.

When the content data is not updated, the tag generator 303 may re-receive a visible light from the lighting apparatus, and iteratively perform an operation of verifying the content data included in the visible light. As an example, the tag generator 303 may verify that the content data is not updated when a movement of the tag generation apparatus 301 is absent, or the lighting apparatus is absent at a position at which the tag generation apparatus 301 is provided. Accordingly, the tag generation apparatus 301 may iteratively perform an operation of re-receiving a visible light from the lighting apparatus to provide content data to a user.

The tag provider 304 may provide the generated tag. In this example, the generated tag may be read by a tag read apparatus, and content data, included in the tag, based on a position at which the lighting apparatus is provided may be extracted from the tag read apparatus.

The tag provider 304 may provide the generated tag using a frequency band. The tag read apparatus may read a tag based on non-contact communication technology through NFC. As an example, the tag provider 304 may read the tag through use of an NFC tag in which a display is unnecessary in a manner dissimilar to a radio frequency identification (RFID) tag.

When the display is included in the tag, the tag provider 304 may provide the tag so as to be readable in the tag read apparatus. As an example, when the tag generation apparatus 301 is included in an automotive navigation system, the tag provider 304 may provide the tag through a display included in the automotive navigation system.

The tag generation apparatus 301 may be a tag generation apparatus capable of VLC and NFC. Accordingly, the tag generation apparatus 301 may convert a visible light received from the lighting apparatus to a tag capable of NFC, and provide the tag to be readable by the tag read apparatus.

The tag generation apparatus 301 may include a power drive unit. The power drive unit may be provided in various forms, such as a battery or an internal power of a predetermined apparatus. The power drive unit may authorize power to drive the tag generation apparatus 301. When the tag generation apparatus 301 is implemented in a form of a holder, the tag generation apparatus 301 may include a charging terminal with respect to a portion contacting the tag read apparatus. In the tag read apparatus, power may be authorized or the battery of the tag read apparatus may be charged through the charging terminal of the tag generation apparatus 301.

Figure 4:
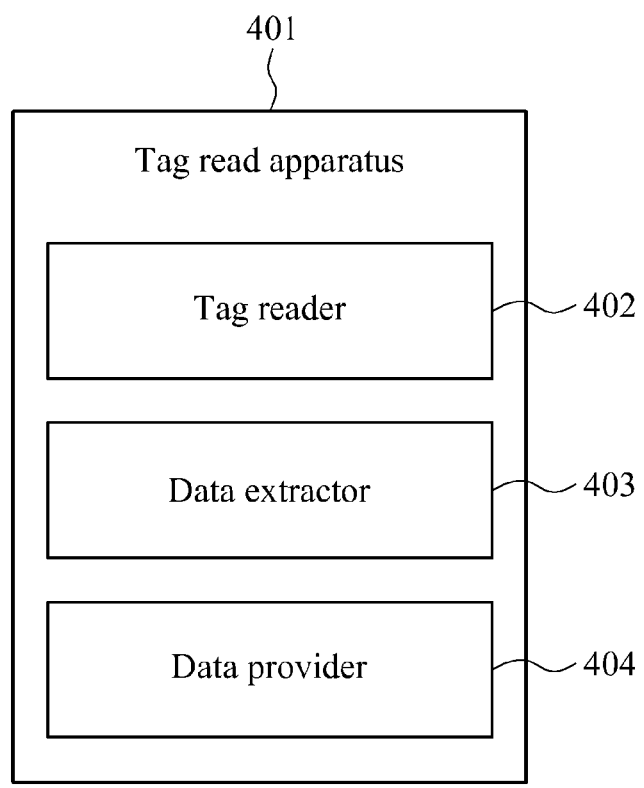
FIG. 4 is a diagram illustrating a configuration of a tag read apparatus according to an embodiment of the present invention.

FIG. 4 is a diagram illustrating a configuration of a tag read apparatus 401 according to an embodiment of the present invention.

Referring to FIG. 4, the tag read apparatus 401 includes a tag reader 402, a data extractor 403, and a data provider 404.

The tag reader 402 may read a tag provided by a tag generation apparatus through NFC. The tag reader 402 may read the tag by approaching, in a predetermined distance, the tag provided by the tag generation apparatus.

The data extractor 403 may extract content data from the read tag. In this example, the content data may include content based on a position at which a lighting apparatus is provided.

The data provider 404 may provide the content data extracted through a display. In this example, the data provider 404 may provide various forms of information using the content data in conjunction with an application included in the tag read apparatus 401. For example, the data provider 401 may provide the content data applied in various manners corresponding to a type of an application in activation.

As an example, in the tag read apparatus 401, an application associated with an exhibition in a gallery may be in activation. The tag read apparatus 401 may receive, from the tag generation apparatus, a tag generated corresponding to a visible light emitted from the lighting apparatus installed in the gallery. The tag read apparatus 401 may provide various forms of information to a user through use of the content data, for example, detailed information on exhibition works showing in the gallery or gallery location guide by allowing the content data included in the received tag to be in conjunction with the application.

For example, the tag read apparatus 401 may utilize the content data through re-configuring the content data in various forms of information based on a purpose of use, rather than read the tag from the tag generation apparatus and provide the content data included in the tag.

Aside from the application described above, the tag read apparatus 401 may be utilized in various applications and may not be limited thereto.

The tag read apparatus 401 may verify whether the tag generated corresponding to the received visible light based on the position at which the lighting apparatus is provided is updated. For example, the tag generation apparatus may receive a visible light including differing content data corresponding to a position at which a lighting apparatus is provided, and generate a tag corresponding to the received visible light. The tag read apparatus may provide the content data included in the tag using the generated tag. In this example, the tag generation apparatus may generate the tag with respect to the differing content data based on the position at which the lighting apparatus is provided. The tag read apparatus 401 may read the differing tags generated based on the position at which the lighting apparatus is provided. Accordingly, the tag read apparatus 401 may verify whether the content data is transmitted through the visible light based on the position at which the lighting apparatus is provided by verifying whether the tag received from the tag generation apparatus is updated.

When the tag is not updated, the tag read apparatus 401 may re-read the tag provided by the tag generation apparatus, and extract the content data from the tag. As an example, when the tag provided by the tag generation apparatus is absent or the tag generation apparatus is absent, the tag read apparatus 401 may verify that the tag is not updated. Accordingly, the tag read apparatus 401 may iteratively perform an operation of re-reading the tag from the tag generation apparatus to provide the content data to a user.

Figure 5:
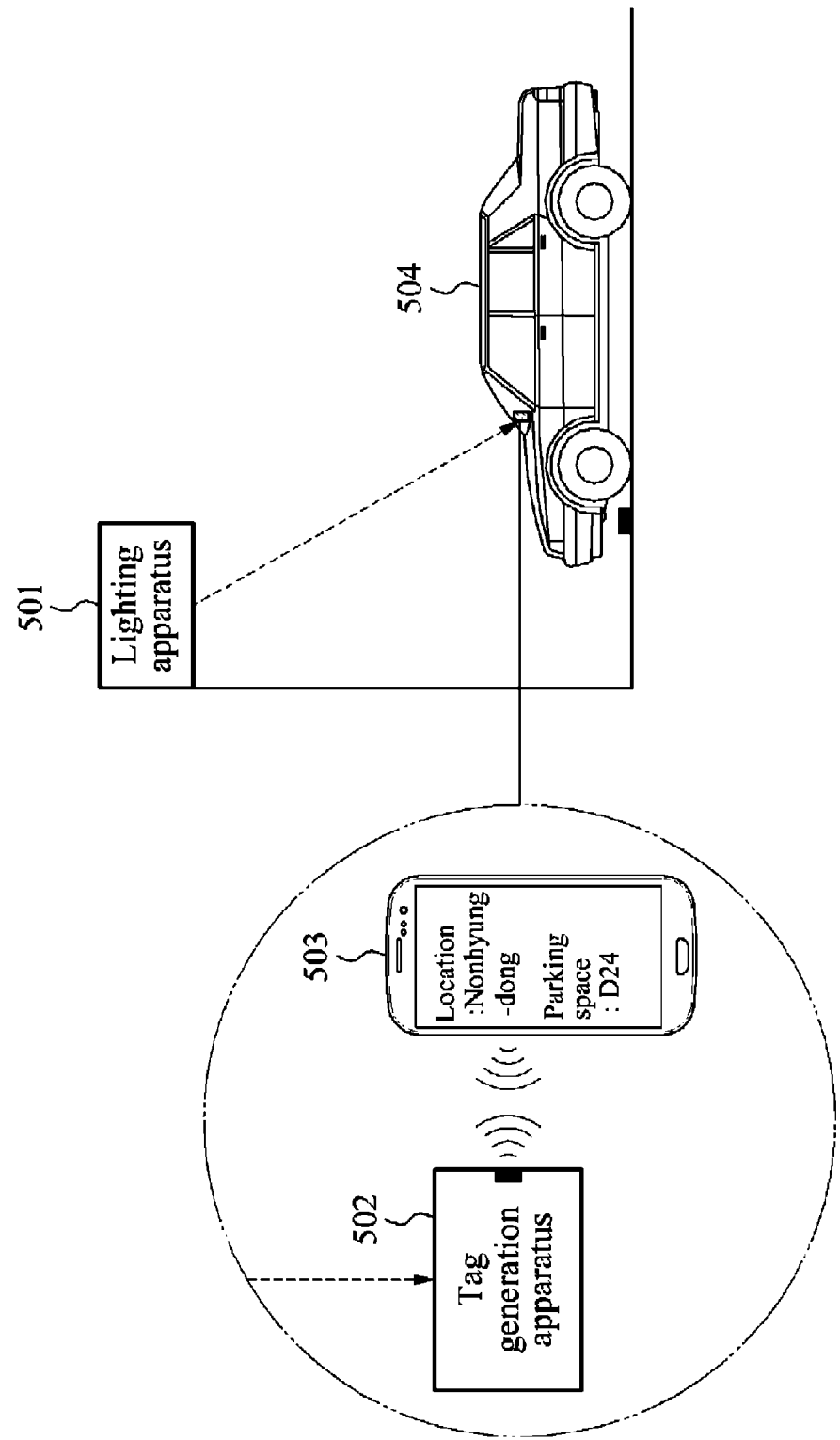
FIG. 5 is a diagram illustrating a method of utilizing a VLC system according to an embodiment of the present invention.

FIG. 5 is a diagram illustrating a method of utilizing a VLC system according to an embodiment of the present invention.

Referring to FIG. 5, a lighting apparatus 501 may be provided at various positions, and provide various forms of information through the VLC system based on the various positions at which the lighting apparatus 501 is provided.

In the lighting apparatus 501, content data based on a position may be stored corresponding to the position at which the lighting apparatus 501 is provided. The lighting apparatus 501 may modulate the stored content data to a visible light so as to be transmittable through the VLC system. The content data modulated to the visible light may be transmitted to the tag generation apparatus 502 through the visible light emitted from the lighting apparatus 501. In this example, the content data modulated to the visible light may be continuously emitted by power supplied to the lighting apparatus 501. For example, the lighting apparatus 501 may continuously emit the visible light by the power supplied to the lighting apparatus 501 irrespective of an existence of the tag generation apparatus 502.

The tag generation apparatus 502 may be provided at various positions, for example, an interior of a vehicle or a movement path of a user. As an example, the tag generation apparatus 502 may be provided at a power drive unit or a bumper of a vehicle 504 or a corridor wall inside a building. As another example, the tag generation apparatus 502 may be employed as an automotive holder through being provided inside a vehicle and also implemented in various different forms.

The lighting apparatus 501 may be provided at a predetermined position of a parking space disposed internally or externally to a building. The tag generation apparatus 502 may be provided inside the vehicle and receive a visible light emitted from the lighting apparatus 501. The tag generation apparatus 502 may demodulate the received visible light, and extract the content data included in the visible light. The tag generation apparatus 502 may generate a tag capable of NFC corresponding to the demodulated content data. The tag read apparatus 503 may read the tag provided by the tag generation apparatus 502. The tag read apparatus 503 may extract the content data using the read tag, and provide the extracted content data through a display. As a result, the user may verify a position at which the vehicle of the user is currently parked using the content data provided by the tag read apparatus 503.

The VLC system may be directed to conveniently provide information to a user based on a position at which a lighting is provided. In the VLC system as shown in FIG. 5, content data, based on a position at which a lighting apparatus is provided, associated with parking space information may be provided to the user.

The VLC system may readily utilize content data provided by a lighting in various manners by using in a variety of application programs, such as an indoor navigation service or a guide service.

Figure 6:
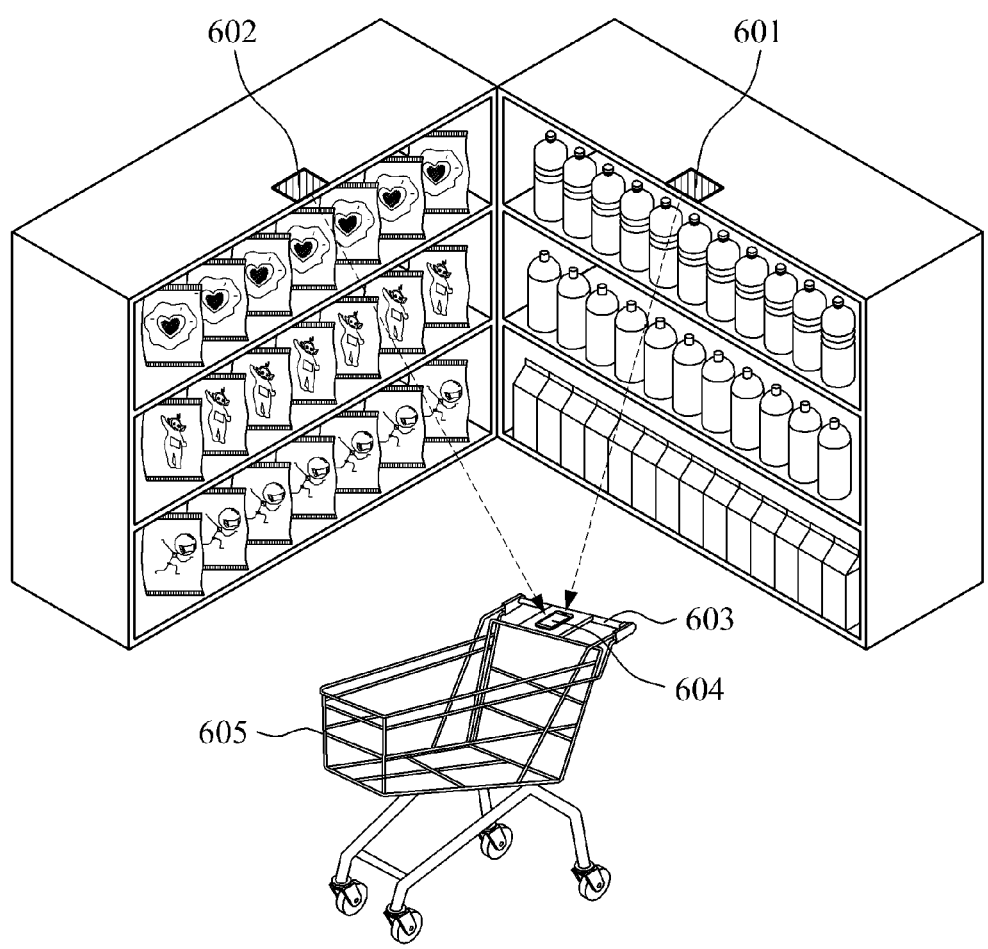
FIG. 6 is a diagram illustrating a method of utilizing a VLC system according to another embodiment of the present invention.

FIG. 6 is a diagram illustrating a method of utilizing a VLC system according to another embodiment of the present invention.

Referring to FIG. 6, lighting apparatuses 601 and 602 are provided at a predetermined position on a shelf on which products are disposed. In this example, the lighting apparatuses 601 and 692 may include content data corresponding to the products disposed on the shelf. The lighting apparatuses 601 and 602 may modulate the content data to a visible light to perform VLC corresponding to the content data included in each of the lighting apparatuses 601 and 602.

As an example, the lighting apparatus 601 may include content data associated with beverage provided on the shelf on which a product associated with beverage is disposed. The lighting apparatus 602 may include content data associated with bakery provided on the shelf on which a product associated with bakery is disposed. The lighting apparatuses 601 and 602 may modulate the content data included in each of the lighting apparatuses 601 and 602 to the visible light.

In this example, the tag generation apparatus 603 may move, and receive the visible light from the lighting apparatuses 601 and 602 based on a movement path. The tag generation apparatus 603 may generate a tag corresponding to the received visible light and provide the tag.

As an example, the tag generation apparatus 603 may be provided in a mobile product 605, such as a shopping cart. The tag generation apparatus 603 may receive the visible light from the lighting apparatuses 601 and 602 while moving in a vicinity of the mobile product 605. The tag generation apparatus 603 may receive the visible light corresponding to a distance between the lighting apparatus 601 and the lighting apparatus 602. For example, the tag generation apparatus 603 may receive the visible light from the lighting apparatuses 601 and 602 provided in vicinity of the tag generation apparatus 603 based on a movement of the product 605. The tag generation apparatus 603 may receive the visible light initially from the lighting apparatus 601 based on the distance between the lighting apparatus 601 and the lighting apparatus 602, and approach the lighting apparatus 602 to receive the visible light.

The tag generation apparatus 603 may include a form in which a tag read apparatus 604 is provided. The tag read apparatus 604 may receive position-based information through a lighting. As shown in FIG. 6, the tag read apparatus 604 may be provided with shopping guide information or advertisement information based on a position from the lighting.

FIG. 7 is a diagram illustrating a method of providing data of a VLC system according to an embodiment of the present invention.

The lighting apparatus 101 may packetize content data based on a position at which a lighting apparatus is provided. The lighting apparatus 101 may modulate the packetized content data to a visible light. The lighting apparatus 101 may transmit the modulated visible light to the tag generation apparatus 102. In this example, the lighting apparatus 101 may transmit the content data through VLC in operation 701.

In operation 702, the tag generation apparatus 102 may receive a visible light from the lighting apparatus 101. The tag generation apparatus 102 may demodulate the received visible light, and extract the demodulated content data.

In operation 703, the tag generation apparatus 102 may generate a tag using the demodulated content data. For example, the tag generation apparatus 102 may analyze the demodulated content data in a packet unit, and generate the tag corresponding to a result of the analysis.

In operation 704, the tag generation apparatus 102 may verify whether the demodulated content data is updated. In this example, when the demodulated content data is not updated, indicated by an arrow "No" of operation 704, the tag generation apparatus 102 may return to operation 702 and re-receive a visible light from the lighting apparatus 101.

When the demodulated content data is not updated, indicated by an arrow "Yes" of operation 704, the tag generation apparatus 102 may provide the generated tag in operation 705.

In operation 706, the tag read apparatus 103 may read the provided tag through NFC. The tag read apparatus 103 may read the tag when the tag read apparatus 103 is adjacent to the tag provided by the tag generation apparatus in a predetermined distance.

In operation 707, the tag read apparatus 103 may verify whether the tag is updated. When the tag is not updated, indicated by an arrow "No" of operation 707, the tag read apparatus 103 may return to operation 706 and re-read the tag provided by the tag generation apparatus 102.

When the tag is updated, indicated by an arrow "Yes" of operation 707, the tag read apparatus 103 may provide the content data included in the tag updated through a display. In this example, the tag read apparatus 103 may utilize the content data in various fields of applications in conjunction with an application currently being activated.

The tag read apparatus 103 may provide the content data in a relatively convenient form of information to a user by utilizing the content data through an application by performing processing on the content data rather than simply providing content data.

The lighting apparatus 101, the tag generation apparatus 102, and the tag read apparatus 103 may be configured to be a system independently operating and organically operating through an iterative process.

According to an aspect of the present exemplary embodiment, it is possible to perform environmentally-friendly communication free from adverse effects of electromagnetic waves occurring in an existing communication method by providing content data based on VLC using a visible light emitted from a lighting.

According to an aspect of the present exemplary embodiment, it is possible to provide position-based information or content information corresponding to a position at which a lighting apparatus is provided through a tag generated using a visible light, and utilize the information provided based on the position at which the lighting apparatus is provided in various programs.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined by the claims and their equivalents. For example, proper results can be achieved although the described techniques are performed in an order different from the methods described or, and/or described system, architecture, device, circuit components such as the methods described in combination with or in combination with other types or other components or substituted or replaced by equivalents.

Therefore, other implementations, other embodiments, and equivalents to appended claims will be described later within the scope of the appended claims.

What is claimed is:

1. A method of providing data performed by a lighting apparatus, the method comprising:
   packetizing content data; and
   modulating the packetized content data to a visible light, and
   transmitting the visible light to a tag generation apparatus,
   wherein the content data is demodulated and generated in a form of a tag capable of near field communication (NFC),
   wherein the tag is readable by a tag reader configured to provide desired content directly to a user without remote access to obtain the desired content, and
   wherein the content data is packetized in a predetermined length based on a volume of the content data.

2. The method of claim 1, wherein the transmitting of the visible light comprises: modulating the packetized content data to the visible light to have a visible light communication (VLC) wavelength transmittable by the lighting apparatus.

3. The method of claim 1, wherein the content data comprises: content based on a position at which the lighting apparatus is provided.

4. A lighting apparatus, comprising:
   a data packetizer to packetize content data; and
   a visible light transmitter to modulate the packetized content data to a visible light, and transmit the visible light to a tag generation apparatus,
   wherein the content data is demodulated and generated, by the tag generation apparatus, in a form of a tag capable of near field communication (NFC),
   wherein the tag is readable by a tag reader configured to provide desired content directly to a user without remote access to obtain the desired content, and
   wherein the content data is packetized in a predetermined length based on a volume of the content data.

5. The lighting apparatus of claim 4, wherein the visible light transmitter modulates the packetized content data to a visible light to have a visible light communication (VLC) wavelength transmittable by the lighting apparatus.

6. The lighting apparatus of claim 4, wherein the content data comprises: content based on a position at which the lighting apparatus is provided.

* * * * *